(12) United States Patent
Takeuchi et al.

(10) Patent No.: US 10,649,249 B2
(45) Date of Patent: May 12, 2020

(54) LIQUID CRYSTAL DRIVING APPARATUS AND LIQUID CRYSTAL DRIVING METHOD

(71) Applicant: TOPPAN PRINTING CO., LTD., Tokyo (JP)

(72) Inventors: Shigeo Takeuchi, Hino (JP); Ryuichi Hirayama, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/925,133

(22) Filed: Mar. 19, 2018

(65) Prior Publication Data

US 2018/0203275 A1   Jul. 19, 2018

Related U.S. Application Data

(63) Continuation of application No. PCT/JP2016/080982, filed on Oct. 19, 2016.

(30) Foreign Application Priority Data

Oct. 22, 2015 (JP) ................... 2015-207883

(51) Int. Cl.
*G02F 1/133* (2006.01)
*G09G 3/18* (2006.01)
(Continued)

(52) U.S. Cl.
CPC ........ *G02F 1/13306* (2013.01); *G02F 1/1343* (2013.01); *G09G 3/18* (2013.01);
(Continued)

(58) Field of Classification Search
CPC combination set(s) only.
See application file for complete search history.

(56) References Cited

U.S. PATENT DOCUMENTS

| 2006/0197729 A1* | 9/2006 | Shiraishi | G02F 1/13306 345/94 |
| 2011/0157501 A1* | 6/2011 | Usui | G03B 17/20 349/33 |
| 2012/0019265 A1* | 1/2012 | Yoshikawa | G06F 3/0416 324/677 |

FOREIGN PATENT DOCUMENTS

| JP | 51-28794 | 3/1976 |
| JP | 51-114896 | 10/1976 |

(Continued)

OTHER PUBLICATIONS

English Translation by WIPO of the International Preliminary Report on Patentability dated May 3, 2018, in corresponding International Patent Application No. PCT/JP2016/080982, 6 pgs.
(Continued)

*Primary Examiner* — Michael J Jansen, II
*Assistant Examiner* — Sosina Abebe (57) ABSTRACT

There is provided a liquid crystal driving apparatus which includes a first substrate and a second substrate, a first counter electrode that is provided on the first substrate so as to face the second substrate, a second counter electrode that is provided on the second substrate so as to face the first substrate, a polymer network liquid crystal layer that is enclosed between the first substrate and the second substrate, and a drive circuit configured to ON-drive the first counter electrode and the second counter electrode by applying a rectangular wave voltage for driving the second counter electrode upon inverting a phase and shifting forward or backward by a minute time Δt with respect to a rectangular wave voltage for driving the first counter electrode.

3 Claims, 6 Drawing Sheets

(51) Int. Cl.
  *G02F 1/1343*   (2006.01)
  *G09G 3/36*     (2006.01)
  *G02F 1/1334*   (2006.01)

(52) U.S. Cl.
  CPC ..... *G09G 3/36* (2013.01); *G02F 2001/13345* (2013.01); *G09G 2310/06* (2013.01); *G09G 2330/023* (2013.01)

(56) References Cited

FOREIGN PATENT DOCUMENTS

| | | |
|---|---|---|
| JP | 2011-137864 | 7/2011 |
| JP | 2013-257522 | 12/2013 |
| TW | 201207810 A1 | 2/2012 |

OTHER PUBLICATIONS

Taiwanese Office Action dated Sep. 28, 2017 in corresponding Taiwanese Patent Application No. 105133976.
International Search Report dated Dec. 13, 2016 in corresponding International Patent Application No. PCT/JP2016/080982.
Written Opinion of the International Searching Authority dated Dec. 13, 2016 in corresponding International Patent Application No. PCT/JP2016/080982.

\* cited by examiner

LIQUID CRYSTAL DRIVING APPARATUS AND LIQUID CRYSTAL DRIVING METHOD

CROSS-REFERENCE TO RELATED APPLICATIONS

This application is a Continuation Application of PCT Application No. PCT/JP2016/080982, filed Oct. 19, 2016 and based upon and claiming the benefit of priority from Japanese Patent Application No. 2015-207883, filed Oct. 22, 2015, the entire contents of all of which are incorporated herein by reference.

FIELD

The present invention relates to a liquid crystal driving apparatus and a liquid crystal driving method suitable for polymer network liquid crystals (PNLCs).

BACKGROUND

Figure 4:
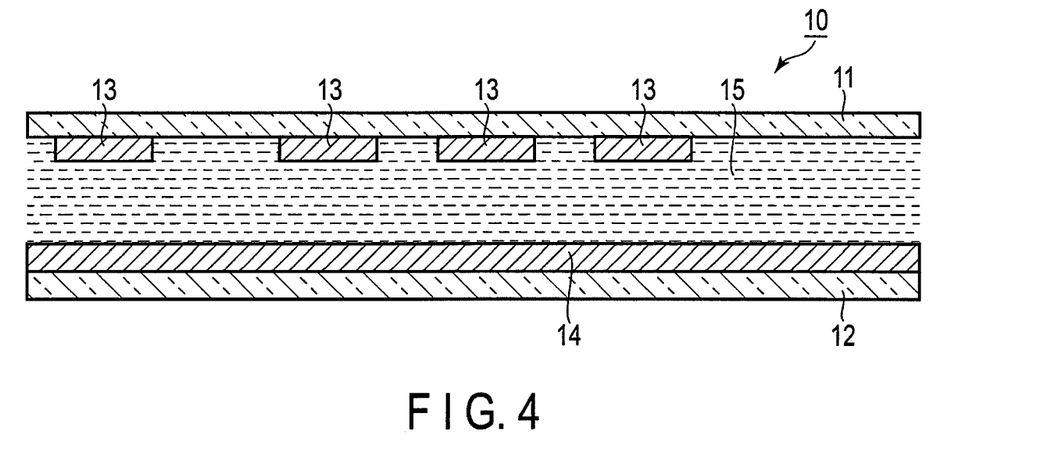
FIG. 4 is a sectional view showing a schematic structure of a polymer network liquid crystal.

FIG. 4 is a sectional view showing a schematic structure of a polymer network liquid crystal 10. In the figure, symbols 11 and 12 each denote a glass substrate, symbols 13, 13, . . . each denote a segment electrode that is a transparent electrode formed on the glass substrate 11, symbol 14 denotes a common electrode that is a transparent electrode formed on the glass substrate 12, and symbol 15 denotes a polymer network liquid crystal layer enclosed between the glass substrates 11 and 12.

When no signals are applied to the segment electrodes 13, 13, . . . , i.e., in an OFF state, liquid-crystal molecules of the polymer network liquid crystal layer 15 are irregularly oriented over the pixel region between each segment electrode 13 and the common electrode 14, causing transmitted light to scatter and yielding an opaque appearance.

On the other hand, when signals are applied to the segment electrode 13, i.e., in an ON state, the liquid-crystal molecules of the polymer network liquid crystal layer 15 are aligned in the direction of an electric field in the pixel region between this segment electrode 13 and the common electrode 14, permitting practically all the transmitted light to pass through and yielding a transparent appearance.

Figure 5:
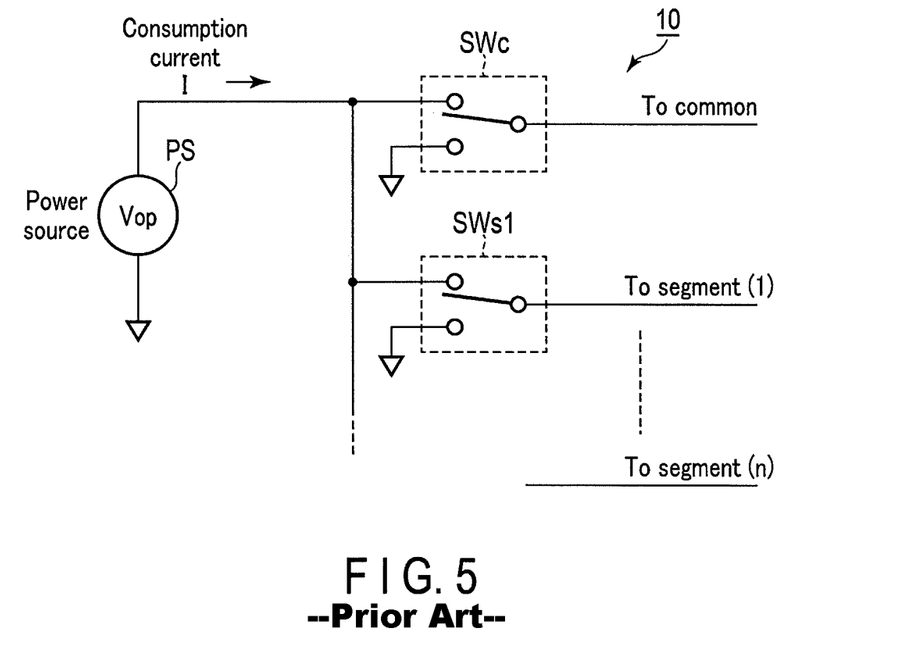
FIG. 5 is a diagram showing a fundamental configuration of a drive circuit for segment electrodes and a common electrode.

FIG. 5 shows a fundamental configuration of a drive circuit for the segment electrodes 13, 13, . . . and the common electrode 14. A power source PS supplies power, which is provided via switches SWc, SWs1, . . . to the common electrode 14 and the segment electrodes 13, 13, . . . in parallel. The switches SWc, SWs1, . . . are adapted to switch a normal/inverted waveform of the power provided to the common electrode 14 and the segment electrodes 13, 13, . . . by their continued operations, respectively.

Figure 6:
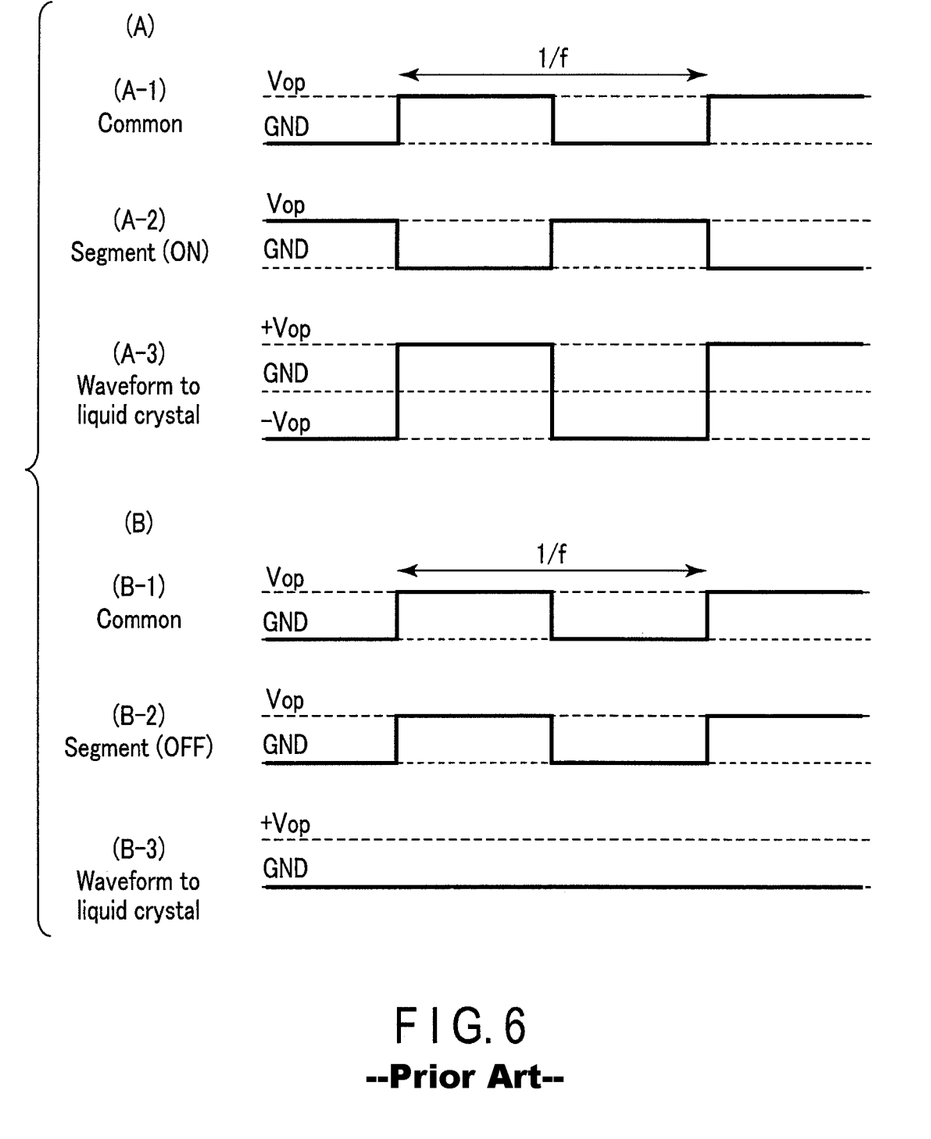
FIG. 6 is a diagram exemplifying voltage waveforms applied to a common electrode and a segment electrode.

FIG. 6 exemplifies the voltage waveforms applied to the common electrode 14 and the given segment electrode 13. FIG. 6 (A) shows the instance where the segment electrode 13 is ON, and FIG. 6 (B) shows the instance where the segment electrode 13 is OFF.

As shown in FIG. 6 (A-1), the common electrode 14 is applied with, for example, rectangular waves having a frequency f=32 [Hz] or so and a wave height Vop. To turn on the segment electrode 13, a voltage that corresponds to the inverted version of the rectangular waves applied to the common electrode 14 is applied to the segment electrode 13, as shown in FIG. 6 (A-2).

This causes the polymer network liquid crystal layer 15 in the pixel region between the segment electrode 13 and the common electrode 14 to be applied with a voltage that has a waveform similar to the voltage applied to the common electrode 14 and a doubled wave height 2Vop ranging from voltage −Vop to +Vop, as shown in FIG. 6 (A-3).

On the other hand, in the instance of FIG. 6 (B) where the segment electrode 13 is OFF, the common electrode 14 is applied with a voltage of rectangular waves as shown in FIG. 6 (B-1), while the segment electrode 13 is applied with a voltage of rectangular waves similar to the rectangular waves applied to the common electrode 14 as shown in FIG. 6 (B-2).

Accordingly, the waveform of the voltage applied to the polymer network liquid crystal layer 15 in the pixel region between the segment electrode 13 and the common electrode 14 becomes flat at the GND level as shown in FIG. 6 (B-3), resulting in no electric field between the electrodes and turning the polymer network liquid crystal layer 15 opaque as discussed above.

The main factor in power consumption of the polymer network liquid crystal 10 is a charge-and-discharge current that follows the capacitance between the common electrode 14 and the segment electrodes 13, 13, . . . when the segment electrodes 13, 13, . . . are turned ON.

A concrete consumption current when the segment electrode 13 is turned ON will be explained using FIG. 7.

Figure 7:
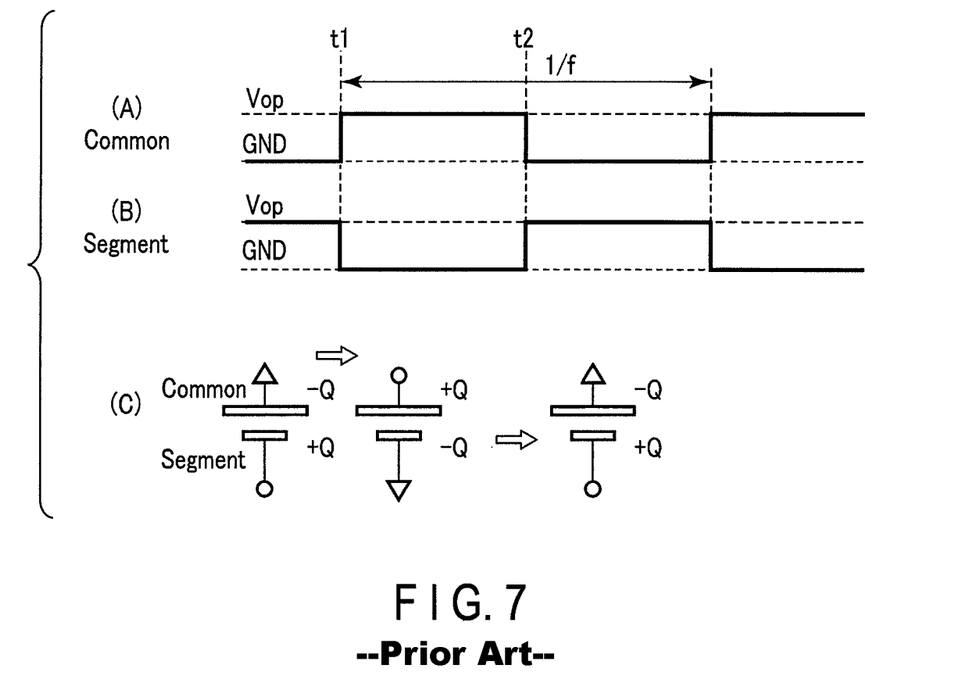

FIG. 7 (A) is a voltage waveform applied to the common electrode 14, and FIG. 7 (B) is a voltage waveform applied to the segment electrode 13. FIG. 7 (C) shows the transfer of electric charges in a pair of the common electrode 14 and the segment electrode 13.

As shown in this figure (C), electric charges of as much as 2 Q, i.e., −Q to +Q, move from the power source PS to the pixel electrode of the liquid crystal 10 twice at a timing t1 and a timing t2 during one cycle 1/f[sec].

Therefore, the consumption current I is given as:

$$I = d(4Q)/dt \qquad (1)$$

Assuming that the capacitance between the common electrode and the segment electrode is C, Q is given as:

$$Q = C*Vop \qquad (2)$$

From the expressions (1) and (2), the consumption current I is:

$$I = 4f*C*Vop \qquad (3)$$

There is a demand for the technique to reduce this consumption current I, further from the content shown by the expression (3).

In this relation, Patent Literature 1 discloses a technique for performing halftone display under a wide range of temperature in a polymer dispersed liquid crystal (PDLC).

CITATION LIST

Patent Literature

Patent Literature 1: Jpn. Pat. Appln. KOKAI Publication No. 2013-257522

SUMMARY

Polymer network liquid crystals, including the technique disclosed in Patent Literature 1, are often incorporated into devices for user's portable use, for example, finders of single-lens reflex cameras. The consumed power required to drive the liquid crystals should desirably be low.

The present invention has been formulated in consideration of such circumstances, and its object is to provide a driving apparatus and a driving method for polymer network liquid crystals that can reduce the consumed power required to drive the liquid crystals so that a power source with a capacity constraint is effectively utilized.

According to one aspect of the present invention, there is provided a liquid crystal driving apparatus comprising: a first substrate and a second substrate; a first counter electrode that is provided on the first substrate so as to face the second substrate; a second counter electrode that is provided on the second substrate so as to face the first substrate; a polymer network liquid crystal layer that is enclosed between the first substrate and the second substrate; and a drive circuit configured to ON-drive the first counter electrode and the second counter electrode by applying a rectangular wave voltage for driving the second counter electrode upon inverting a phase and shifting forward or backward by a minute time $\Delta t$ with respect to a rectangular wave voltage for driving the first counter electrode.

According to the present invention, it is possible to reduce the consumed power required to drive the liquid crystals so that a power source with a capacity constraint is effectively utilized.

BRIEF DESCRIPTION OF THE DRAWINGS

FIG. 3 is a diagram for explaining a concrete consumption current when the segment electrode according to the embodiment is turned ON;

FIG. 7 is a diagram for explaining a concrete consumption current when a segment electrode is turned ON.

DETAILED DESCRIPTION

Embodiments will be described with reference to the drawings. Note that the drawings are schematic or conceptual, and it is not a requisite that the dimensions, scales, etc. read from each drawing conform to actual products. Also, the drawings may show same portions in different dimensional relationships or scales. In particular, the following embodiments are exemplifications of the apparatuses and the methods for embodying the technical idea of the present invention, which will not be limited by components' shapes, structures, arrangements, etc. The description will use same symbols for the elements having the same functions and configurations, and will repeat explanations only if necessary.

[Configuration of Liquid Crystal Driving Apparatus]

Figure 1:
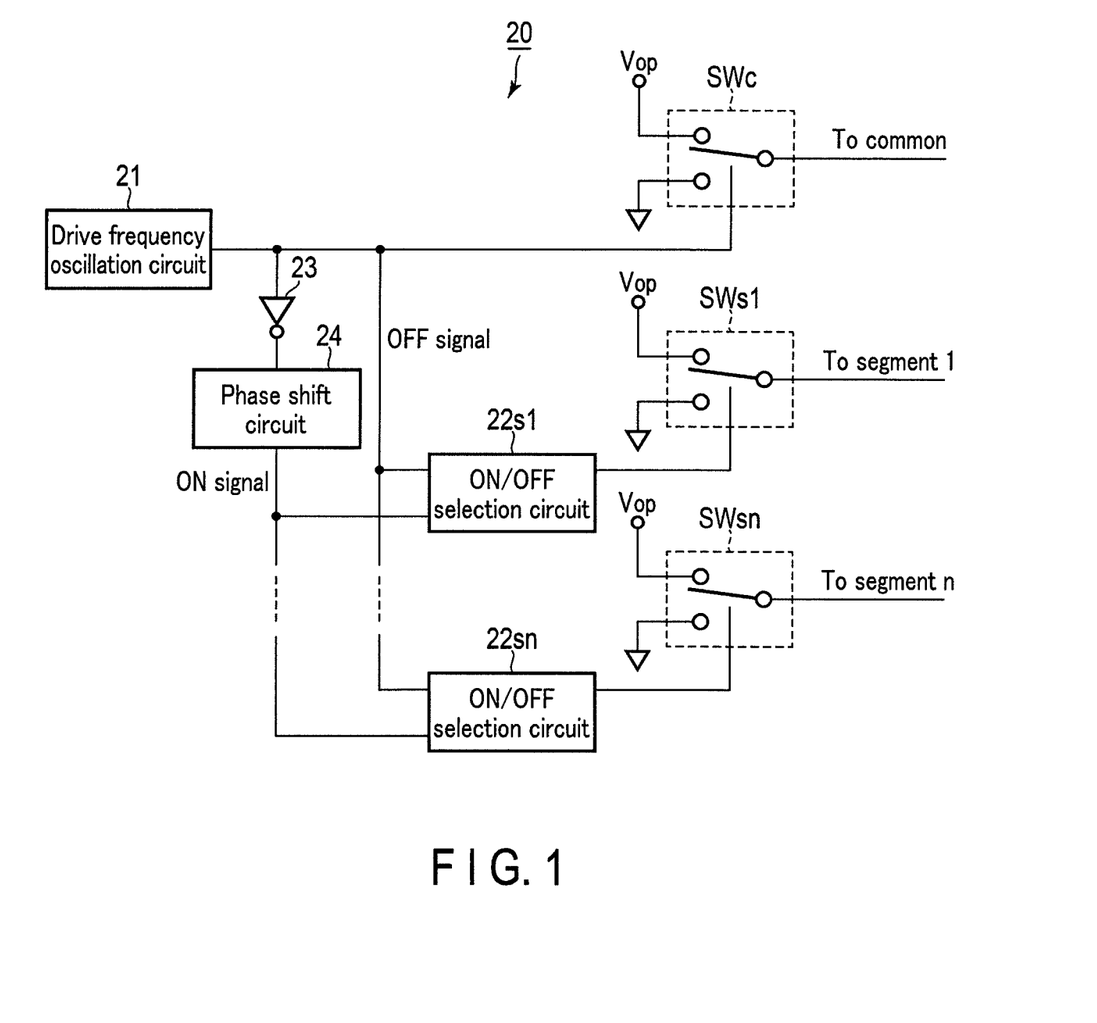
FIG. 1 is a diagram mainly showing the configuration of a drive system for a liquid crystal driving apparatus according to one embodiment of the present invention.

FIG. 1 is a diagram mainly showing the configuration of a drive system for a liquid crystal driving apparatus 20 according to an embodiment of the present invention. In the figure, either a voltage Vop from a power source or a GND level is given to a common electrode and segment electrodes via switches SWc, SWs1, . . . and SWsn.

Symbol 21 in the figure denotes a drive frequency oscillation circuit to provide drive frequency signals for ON/OFF driving the switches SWc, SWs1, . . . and SWsn. The drive frequency signals oscillated by this drive frequency oscillation circuit 21 are rectangular waves. These rectangular wave signals are directly given to the switch SWc for the common electrode, and also they are given as OFF signals to ON/OFF selection circuits 22s1, . . . and 22sn for the segment electrodes in parallel.

Furthermore, the drive frequency signals oscillated by the drive frequency oscillation circuit 21 are polarity-inverted at an inverter 23, processed at a phase shift circuit 24 so that the phase of the rectangular waves is shifted forward or backward by a minute time $\Delta t$ as will be discussed, and given as ON signals to the ON/OFF selection circuits 22s1, . . . and power source 22sn in parallel.

This embodiment will assume that the phase shift circuit 24 shifts forward the polarity-inverted drive frequency signals coming from the inverter 23, by the minute time $\Delta t$.

The ON/OFF selection circuits 22s1, . . . and 22sn select, according to the ON/OFF of the respective applicable segment electrodes, either the ON signal given directly from the drive frequency oscillation circuit 21 or the polarity-inverted, phase-shifted OFF signal given via the inverter 23 and the phase shift circuit 24, and apply the selected signal to the applicable segment electrodes.

[Operation of Liquid Crystal Driving Apparatus]

Figure 2:
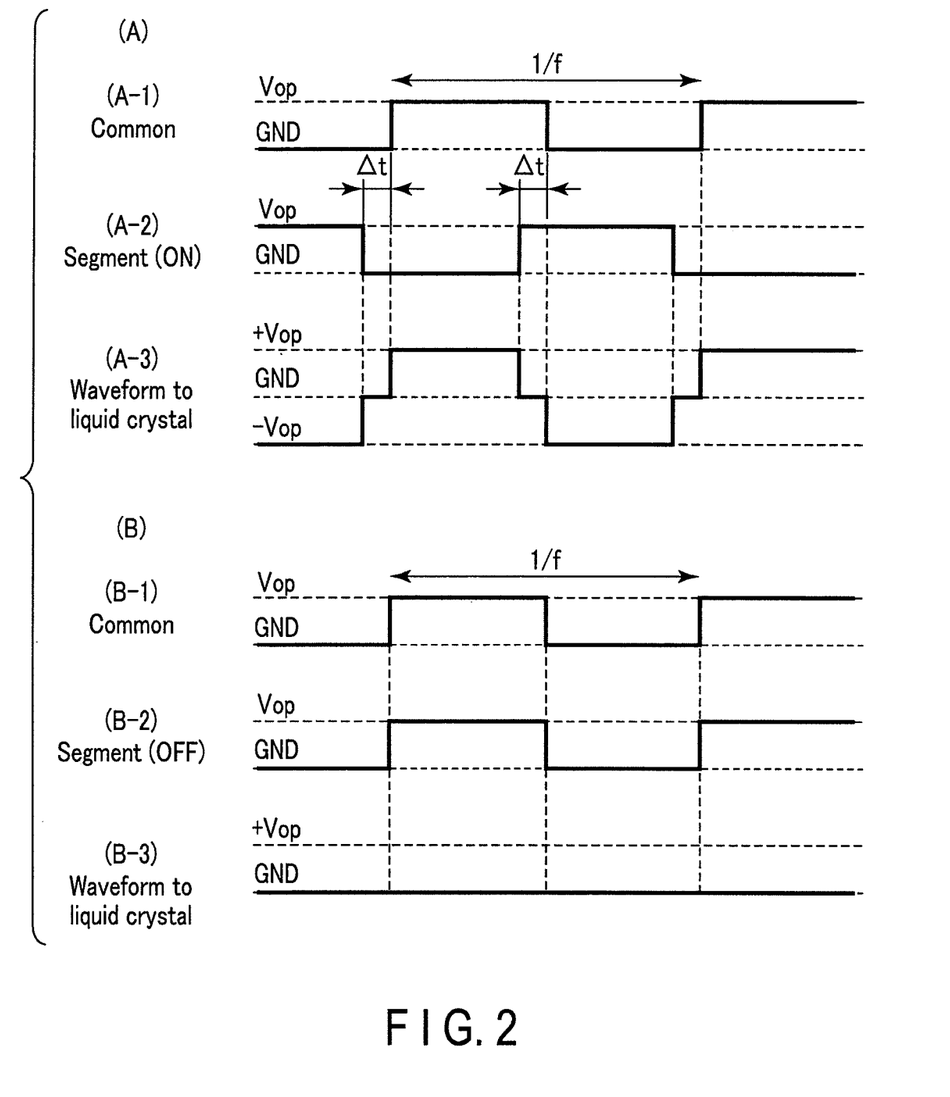
FIG. 2 is a diagram exemplifying voltage waveforms applied to a common electrode and a segment electrode according to the embodiment.

FIG. 2 exemplifies the voltage waveforms applied to the common electrode and the segment electrode. FIG. 2 (A) shows the instance where the segment electrode is ON, and FIG. 2 (B) shows the instance where the segment electrode is OFF.

As shown in FIG. 2 (A-1), the common electrode is applied with, for example, rectangular waves having a frequency f=32 [Hz] or so and a wave height Vop, based on the switching control with the drive frequency signals from the drive frequency oscillation circuit 21 to the switch SWc.

To turn on the segment electrode, the ON signal output from the phase shift circuit 24 is selected at the ON/OFF selection circuit 22sx (x=1, . . . , or n) for the switching control of the applicable segment electrode. Thereby, a voltage corresponding to the rectangular waves applied to the common electrode, having been inverted and shifted forward by the minute time $\Delta t$, is applied to the segment electrode as shown in FIG. 2 (A-2).

In this case, the phase shift circuit 24 performs phase shift processing that, in more specific terms, delays the output of the inverter 23 by an amount of time, 1/f-$\Delta t$, so as to generate the ON signal with a forward shift of as much as the time $\Delta t$ as compared to what would be obtained by polarity-inverting the OFF signal.

As a result, a polymer network liquid crystal layer in the pixel region between the segment electrode and the common electrode is applied with a voltage that has a waveform showing a step at the GND level at the timing of the time $\Delta t$ and ranging from voltage −Vop to +Vop, as shown in FIG. 2 (A-3).

On the other hand, in the instance of FIG. 2 (B) where the segment electrode is OFF, the common electrode is applied with a voltage of rectangular waves as shown in FIG. 2 (B-1), while the segment electrode is also applied with a voltage of rectangular waves similar to the rectangular waves applied to the common electrode as shown in FIG. 2 (B-2).

Accordingly, the waveform of the voltage applied to the polymer network liquid crystal layer in the pixel region between the segment electrode and the common electrode becomes flat at the GND level as shown in FIG. 2 (B-3), resulting in no electric field between the electrodes and turning the polymer network liquid crystal layer opaque as discussed above.

Figure 3:
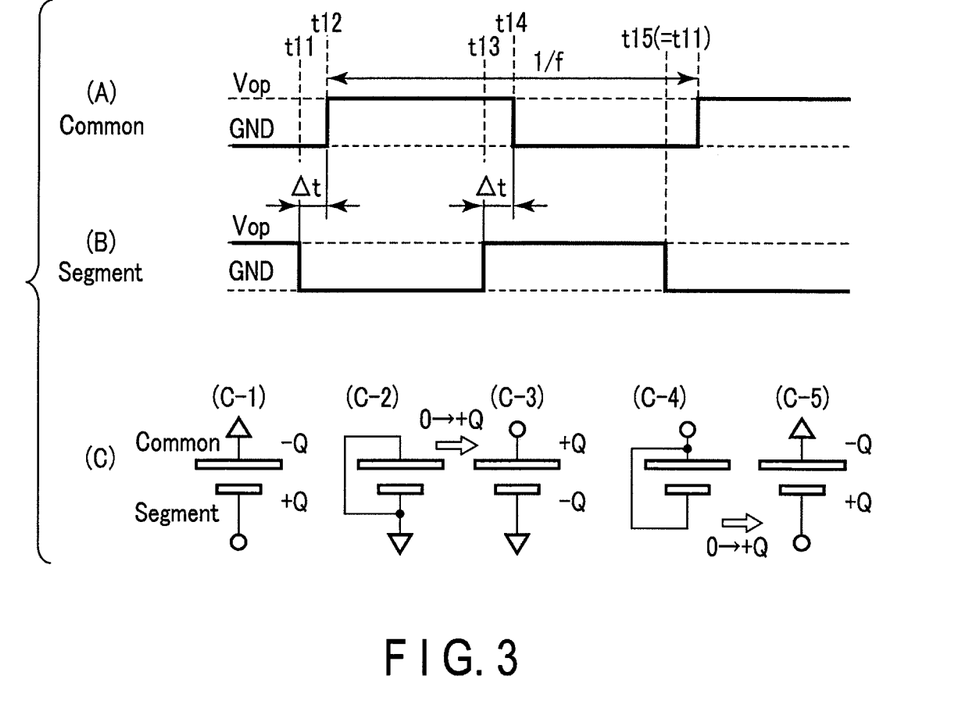

A concrete consumption current when the segment electrode is turned ON will be explained using FIG. 3. FIG. 3 (A) is a voltage waveform applied to the common electrode, and FIG. 3 (B) is a voltage waveform applied to the segment electrode. FIG. 3 (C) shows the transfer of electric charges in a pair of the common electrode and the segment electrode.

As shown in this figure (C), on or before a timing t11 that is the minute time Δt prior to an original timing t12 for one cycle 1/f [sec], the common electrode has a potential of GND and the segment electrode has a potential of Vop so that the common-side charge is −Q and the segment-side charge is +Q as shown in FIG. 3 (C-1).

For the minute time Δt from the timing t11 until the timing t12, the potentials of the common electrode and the segment electrode both become GND and the difference in potential vanishes as shown in FIG. 3 (C-2). As such, the electric charges of the electrodes are neutralized into 0.

Furthermore, on or after the timing t12 at which the voltage Vop is applied to the common electrode following the change to the segment electrode, the potential of the common electrode becomes Vop while the potential of the segment electrode is GND as shown in FIG. 3 (C-3). As such, the common-side charge becomes +Q and the segment-side charge becomes −Q.

At this time, electric charges of as much as Q, from 0 to +Q, move between the power source and the pixel electrode of the liquid crystal.

Furthermore, for the minute time Δt from a timing t13 until a timing t14, the potentials of the common electrode and the segment electrode now both become Vop and the difference in potential vanishes again as shown in FIG. 3 (C-4). As such, the electric charges of the electrodes are neutralized into 0.

Then, on or after the timing t14 at which the common electrode becomes GND following the change to the segment electrode, the potential of the segment electrode is Vop and the potential of the common electrode is GND as shown in FIG. 3 (C-5). As such, the segment-side charge becomes +Q and the common-side charge becomes −Q.

At this time, electric charges of as much as Q, from 0 to +Q, move between the power source and the pixel electrode of the liquid crystal.

In this manner, electric charges of as much as Q, i.e., 0 to +Q, move between the power source and the pixel electrode of the liquid crystal twice during one cycle 1/f of from the timing t11 to a timing t15.

Therefore, the consumption current I is given as:

$$I = d(2Q)/dt \tag{4}$$

Assuming that the capacitance between the common electrode and the segment electrode is C, Q is given as:

$$Q = C*Vop \tag{5}$$

From the expressions (4) and (5), the consumption current I is:

$$I = 2f*C*Vop \tag{6}$$

The consumption current I according to this expression (6) is ½ of the current I given by the expression (3) above.

The minute time Δt is set to a value greater than the charge-and-discharge time based on the electrostatic capacitance C between the common electrode and the segment electrode. The minute time Δt is given as a time that allows for the transfer of electric charges in these electrodes when the electrodes become the same potential so that the neutralization securely results.

The embodiments have been described assuming that the phase shift circuit 24 shifts forward the phase of the change of voltage applied to the segment electrode by the minute time Δt as compared to the phase of the change of voltage applied to the common electrode. However, the phase may also be shifted backward. In that case, the phase shift circuit 24 is constituted by a delay circuit that delays input signals by the minute time Δt.

[Effects of Liquid Crystal Driving Apparatus]

According to the embodiments as detailed above, it is possible to greatly reduce the consumed power required to drive liquid crystals so that a power source with a capacity constraint is effectively utilized. The present invention is not limited to the embodiments described, but can be modified in various ways in practice without departing from the gist of the invention. Also, the functions performed in the described embodiments may be suitably combined for implementation as much as possible. The described embodiments involve various aspects, and appropriate combinations of the disclosed features permit various inventions to be derived. For example, if omission of several features from the whole configuration or structure disclosed for the embodiments would provide the effects, the configuration or structure after such omission of features may be derived as an invention.

The invention claimed is:

1. A liquid crystal driving apparatus comprising:
   a first substrate and a second substrate;
   a first counter electrode that is provided on the first substrate so as to face the second substrate;
   a second counter electrode that is provided on the second substrate so as to face the first substrate;
   a polymer network liquid crystal layer that is enclosed between the first substrate and the second substrate; and
   a drive circuit configured to ON-drive the first counter electrode and the second counter electrode by applying a rectangular wave voltage for driving the second counter electrode upon inverting a phase and shifting forward or backward by a minute time Δt with respect to a rectangular wave voltage for driving the first counter electrode,
   wherein the minute time Δt is longer than a charge-and-discharge time based on an electrostatic capacitance between the first counter electrode and the second counter electrode.

2. The liquid crystal driving apparatus according to claim 1, wherein the drive circuit applies a voltage to the first counter electrode and the second counter electrode upon neutralizing electric charges between the first counter electrode and the second counter electrode during the minute time Δt.

3. A liquid crystal driving method for a device that includes a first electrode, a second electrode, a first counter electrode that is provided on the first substrate so as to face the second substrate, a second counter electrode that is provided on the second substrate so as to face the first substrate, and a polymer network liquid crystal layer that is enclosed between the first substrate and the second substrate, the method comprising:
   ON-driving the first counter electrode and the second counter electrode by applying a rectangular wave voltage for driving the second counter electrode upon inverting a phase and shifting forward or backward by a minute time Δt with respect to a rectangular wave voltage for driving the first counter electrode,
wherein the minute time Δt is longer than a charge-and-discharge time based on an electrostatic capacitance between the first counter electrode and the second counter electrode.

* * * * *